(12) United States Patent
Tillier et al.

(10) Patent No.: US 8,712,746 B2
(45) Date of Patent: Apr. 29, 2014

(54) METHOD OF MODIFIED FACIES PROPORTIONS UPON HISTORY MATCHING OF A GEOLOGICAL MODEL

(75) Inventors: Elodie Tillier, Rueil Malmaison (FR); Guillaume Enchéry, Rueil Malmaison (FR); Véronique Gervais-Couplet, Rueil Malmaison (FR); Mickaële Le Ravalec, Rueil Malmaison (FR)

(73) Assignee: IFP, Rueil-Malmaison (FR)

( * ) Notice: Subject to any disclaimer, the term of this patent is extended or adjusted under 35 U.S.C. 154(b) by 913 days.

(21) Appl. No.: 12/781,844

(22) Filed: May 18, 2010

(65) Prior Publication Data
US 2010/0332205 A1   Dec. 30, 2010

(30) Foreign Application Priority Data

Jun. 26, 2009   (FR) ..................... 09 03163

(51) Int. Cl.
*G06G 7/50*   (2006.01)
*G06G 7/48*   (2006.01)
(52) U.S. Cl.
USPC .................................. 703/9; 703/10
(58) Field of Classification Search
USPC ............................................. 703/9, 10
See application file for complete search history.

(56) References Cited

U.S. PATENT DOCUMENTS

| 2002/0013687 A1* | 1/2002 | Ortoleva | 703/10 |
| 2009/0070086 A1* | 3/2009 | Le Ravalec et al. | 703/10 |
| 2009/0281776 A1* | 11/2009 | Cheng et al. | 703/2 |

OTHER PUBLICATIONS

O. Lerat et al.: "Construction of a Stochastic Geological Model Constrained by High-Resolution 3D Seismic Data—Application to the Girassol Field Offshore Angola", Society of Petroleum Engineers, 110422, Nov. 11, 2007-Nov. 14, 2007, pp. 1-16, XP002568891 Arnaheim (sic), California, USA.
F. Roggero et al.: "Matching of Production History and 4D Seismic Data—Application to the Girassol Field, Offshore Angola", Society of Petroleum Engineers, 109929, Nov. 11, 2007-Nov. 14, 2007, XP0025688922, pp. 1-20.
Clayton V. Deutsch: "A Sequential Indicator Simulation Program for Categorical Variables with Point and Block Data: BlockSIS*", Computer and Geosciences, vol. 32, 2006, pp. 1669-1681, XP002568893.
Shuguang Mao et al.: "Conditional 3D Simulation of Lithofacies with 2D Seismic Data", Computer and Geosciences, vol. 25, 1999, pp. 845-862, XP002568894.

(Continued)

*Primary Examiner* — Kamini S Shah
*Assistant Examiner* — Andre Pierre Louis
(74) *Attorney, Agent, or Firm* — Antonelli, Terry, Stout & Kraus, LLP.

(57) ABSTRACT

A method of modifying a geological model representative of an underground reservoir is disclosed which respects average proportions of the lithologic facies imposed by a production data calibration process which has application to petroleum reservoir development. A geographical zone Z is defined within the geological model and an average proportion in zone Z allowing the production data to be calibrated is determined for k facies, with an optimization process. The proportions of these facies are modified using a block indicator cokriging method constrained by the average proportions to be respected. A new geological model constrained by the modified facies proportions is simulated and the development of the underground medium is optimized by the simulated model.

2 Claims, 3 Drawing Sheets

(56) References Cited

OTHER PUBLICATIONS

RamaRao, Banda S., et al: "Pilot Point Methodology for Automated Calibration of an Ensemble of Conditionally Simulated Transmissivity Fields, 1. Theory and Computational Experiments.", Water Resources Research, vol. 31, No. 3, pp. 475-493, Mar. 1995.

Gómez-Hernánez, J. Jaime, et al: "Stochastic Simulation of Transmissivity Fields Conditional to Both Transmissivity and Piezometric Date—I. Theory.", Journal of Hydrology, 203, Jul. 15-16, 1997, pp. 162-174.

Hu, Lin Y: "Gradual Deformation and Iterative Calibration of Gaussian-Related Stochastic Models," in Mathematical Geology, vol. 32, No. 1, Jan. 2000, pp. 87-108.

Hoffman, B.T., et al: "History Matching by Jointly Perturbing Local Facies Proportions and Their Spatial Distribution: Application to a North Sea Reservoir", Journal of Petroleum Sicence and Engineering 57 (2007), pp. 257-272.

Hoffman B. Todd, et al: "Regional Probability Perturbations for History Matching", Journal of Petroleum Science and Engineering 46 (2005), pp. 53-71.

Liu, Ning, et al: "Automatic History Matching of Geologic Facies", SPE 84594, Proceeding of the 2003 SPE Annual, Technical Conference and Exhibition, SPE Journal, 9(4): Dec. 2004 pp. 429-436.

Le Loc'H, G., et al: "Truncated Plurigaussian Method: Theoretical and Practical Points of View," Geostatistics Wollongong '96, E.Y. Baafi and N.A. Schofields eds. Kluwe, pp. 211-222.

* cited by examiner

METHOD OF MODIFIED FACIES PROPORTIONS UPON HISTORY MATCHING OF A GEOLOGICAL MODEL

BACKGROUND OF THE INVENTION

1. Field of the Invention

The present invention relates to petroleum reservoir exploration and development, and more particularly to petroleum reservoir imaging. The invention relates to a history matching method for a geological model representative of an underground reservoir which respects average proportions of lithologic facies. Constructing images representative of the subsoil and compatible with data measured in wells and/or the entire reservoir being studied allows reservoirs to be developed.

2. Description of the Prior Art

Studying a petroleum field requires constructing models referred to as "geological models" in a broad sense. These models, which are computer based, are well known and widely used in the petroleum industry, allow for example determination of many technical parameters relative to prospecting, study or development of a hydrocarbon reservoir. In fact, these geological models are representative of structures of reservoirs and of the behavior thereof. It is possible to determine which zones are the most likely to contain hydrocarbons, the zones in which it can be interesting/necessary to drill an injection well in order to enhance hydrocarbon recovery, the type of tools to use and the properties of the fluids used and recovered, etc. These interpretations of geological models in terms of "technical development parameters" are well known, even though new methods are regularly developed. It is crucial, in the petroleum field, to construct a model as precise as possible. Integration of all the available data is therefore essential.

A geological model is a model of the subsoil, representative of both the structure and the behavior thereof. Generally, this type of model is represented in a computer and is referred to as a numerical model. In two dimensions (2D), the model is referred to as a map. Thus, a map corresponds to an image of pixels with each pixel containing information relative to the behavior of the subsoil being studied (a petroleum reservoir for example). These pixels correspond to a precise geographical position and are identified by coordinates. When values are assigned to a pixel, by simulation for example, reference is made to a simulation point. The representative image (map or model) is generated on any support (paper, computer screen, etc.).

Petroleum reservoirs are generally highly heterogeneous and fractured porous media. Modelling a reservoir, that is constructing a geological model representative of the reservoir, requires construction methods referred to as "probabilistic" due to the limitation of available information (limited number of wells, etc.). The geological models constructed from these probabilistic methods are therefore referred to as "stochastic models". Construction of a stochastic reservoir model first has to depend on the environment of the geological deposit, which allows representation of the major heterogeneities controlling the flow of fluids. A model then has to be constrained by quantitative data such as core data, log data and seismic data, which further increases the reliability of the model for production prediction. Thus, geostatistical modelling is used to construct geological models that best respect the available static data (well data, seismic data, etc.), that is the time-invariant data directly linked with the modelled properties.

In order to obtain the best possible image of the reservoir, it is necessary, in addition to static data, to integrate dynamic data. The dynamic data are indirectly linked with the modelled properties and they are time-dependent. These data are, for example, oil flow rates measured in wells, tracer concentrations or successive repeat seismic acquisition surveys.

The integration of production and seismic data in a reservoir model is a process referred to as "history matching" of a geological model. The principle modifies the initial geological model iteratively until the simulated dynamic behavior is as close as possible to the observed dynamic behaviour. This problem is solved by adjusting some parameters of the geological model by minimizing a function referred to as objective function, which quantifies the difference between the dynamic data and the simulated corresponding responses.

Many techniques have been developed in the past years for modifying the geological model while preserving coherence with respect to the static observations. A geological model contains information on the petrophysical properties. The available static data are used to define random functions for each petrophysical property. A representation of the spatial distribution of a petrophysical property is a realization of a random function. The perturbation techniques allow modification of a realization of a random function while ensuring the fact that the perturbed realization is also a realization of this random function.

Examples of these perturbation techniques are the pilot point method developed by RamaRao et al. (1995) and Gomez-Hernandez et al. (1997), as well as the gradual deformation method provided by Hu (2000). These methods allow modification of the spatial distribution of the heterogeneities.

RamaRao, B. S; Lavenue, A. M.; Marsilly, G. de; Marietta, M. G.; Pilot Point Methodology for of an Ensemble of Conditionally Simulated Transmissivity Fields. 1. Theory and Computational Experiments. WRR, 1995, vol. 31 (3), 475-493.

Gomez-Hernandez, J., Sahuquillo, A., et Capilla, J. E., 1997, Stochastic Simulation of Transmissivity Fields Conditional to Both Transmissivity and Piezometric Data, 1. Theory, J. of Hydrology, 203, 162-174.

Hu, L-Y., 2000, Gradual Deformation and Iterative Calibration of Gaussian-related Stochastic Models, Math. Geol., 32(1), 87-108.

A particularly sensitive property for the development of a reservoir is the lithologic facies proportion. In fact, lithologic facies proportions can have a major impact on the dynamic behavior of an oil field. They can be identical over the entire domain (stationary case) or vary depending on the position (non-stationary case). What is referred to as lithologic facies is a property of a rock. For example, the lithologic facies can refer to the geological nature of the rock (clay, sandstone, limestone, etc.), to its porosity type (unconsolidated and very porous rock; low-porosity rock, etc.), or to the nature of the fluid trapped in the pores (brine, oil, gas, etc.).

Usually, well data are used to determine one or more vertical facies proportion curves. These curves give the probability of occurrence of each facies as a function of depth. These curves are then used to construct, notably from kriging techniques, a facies proportion matrix that determines, for each cell of the grid representative of the reservoir, the occurrence probabilities of the various facies. These probabilities constrain the spatial distribution of the facies in the geological model.

Hoffman and Caers (2007) provide a method allowing increasing or decreasing the proportion of the various facies according to results if the simulated dynamic production.

This method complements the probability perturbation method (Hoffman and Caers, 2005) and it cannot be used alone.

Hoffman B. T., and Caers, J., History Matching by Jointly Perturbing Local Facies Proportions and Their Spatial Distribution: Application to a North Sea reservoir, Journal of Petroleum Science and Engineering 57 (2007) 257-272.

Hoffman B. T., and Caers, J., Regional Probability Perturbation for History Matching, J. Pet. Sci. Eng. 46, 53-71.

Another approach proposed by Liu and Oliver (2004) modifies the amounts of the various facies by acting directly upon the truncation thresholds used in the pluri-Gaussian method. The pluri-Gaussian method is a conventional known method, for generating a facies realization.

Liu, N. and Oliver, D. S., Automatic History Matching of Geologic Facies, SPE 84594, Proceeding of the 2003 SPE Annual, Technical Conference and Exhibition, SPE Journal, 9(4): 1-15, 2004.

Le Loc'h G. and Galli, A., 1997: Truncated Plurigaussian method: Theoretical and Practical Points of View. Geostatistics Wollongong '96, E. Y. Baafi and N. A. Schofields eds, Kluwe, p. 211-222.

Finally, another method is described in French Patent 2,914,434. It is a parameterization method that modifies the ratio of the average proportion over a zone of a facies association in relation to a facies selection.

SUMMARY OF THE INVENTION

The invention is an alternative method allowing modification of a geological model by transforming locally or globally the lithologic facies proportions in order to constrain the geological model by dynamic data. The method is based on co-kriging techniques for providing spatial continuity of the perturbations locally applied to the proportions to obtain a more realistic image of the petroleum reservoir studied.

The invention is a method of optimizing the development of an underground medium, from a geological model having a set of grid cells discretizing the medium with a facies value assigned to each cell. A difference is measured between measured dynamic data values and simulated dynamic data values with a computer based flow simulator applied to the geological model with the geological model being modified to reduce the difference. The method comprises:
  a). defining at least one geographical zone Z within the underground medium by selecting a set of cells of the geological model;
  b). determining, for k facies, by using an optimization process with an average proportion $(p_Z^k)^f$ in zone Z allowing the difference to be reduced;
  c). modifying proportions of the k facies in each cell of the geographical zone, with a block indicator cokriging method constrained by the average proportion $(p_Z^k)^f$, by assigning a zero value to any modified proportion which is less than zero, assigning a value one to any modified proportion which is greater than one, and normalizing all modified facies proportions so that, in each cell, a sum of the facies proportions is equal to one; and
  d). simulating a new geological model constrained by the modified facies proportions and optimizing the development of the underground medium with the simulated model.

According to the invention, the geographical zone can be a sub-domain of the geological model, a group of sub-domains of the geological model or the entire geological model.

BRIEF DESCRIPTION OF THE DRAWINGS

Other features and advantages of the method according to the invention will be clear from reading the description hereafter of non-limitative embodiment examples, with reference to the accompanying figures wherein.

DETAILED DESCRIPTION OF THE INVENTION

The invention relates to a method allowing calibration of a geological model with respect to dynamic data by modifying locally or globally the lithologic facies proportions.

The method can comprise the following stages:
1. Acquisition of measurements relative to the structure and the nature of the underground reservoir
2. Construction of a geological model representative of the underground reservoir
3. Calibration of the geological model by dynamic data (history matching)
4. Optimization of the underground medium development from the calibrated model 1. Acquisition of Measurements Relative to the Structure and the Nature of the Underground Reservoir Static data (logs, measurements on samples taken in wells, seismic data, etc.) are first measured in the field. These data provide information on the structure of the medium, the nature and the petrophysical properties of the rocks that make up the underground medium. These measurements allow discretization of the underground medium in a form of a grid to associate with each grid cell of the medium physical property values that characterize the porous medium. These measurements also allow construction of vertical facies proportion curves. These curves describe the evolution of the proportions of each facies as a function of depth. Such a curve is obtained from well information. For each reservoir layer, on the stratigraphic scale, the frequency of occurrence of each facies is counted to deduce a proportion therefrom. There may be one or more vertical proportion curves to describe a reservoir and if there is only one, the facies proportions are stationary. In the opposite case, if the curves are different, the facies proportions are non-stationary. These curves are used to determine a proportion matrix that specifies the proportion or the probability of occurrence of each facies in each reservoir cell. By perturbing the vertical proportion curves, it is possible to modify the entire proportion matrix.

Dynamic data (production data, well tests, breakthrough times, data obtained from repeat seismic surveys (4D), etc.), whose specific feature is to vary over time according to the fluid flows in the reservoir, are also measured in the field.

2. Construction of a Geological Model Representative of the Underground Reservoir A geological model representative of a petroleum reservoir is first achieved on a fine scale. This model respects the static data, that is the data that do not depend on fluid motions within the modelled reservoir.

According to the invention, this initial geological model describes the studied reservoir in lithologic facies. Many known techniques allow a constrained geological model to be constructed. Examples thereof are the non-stationary modelling techniques, such as thresholded Gaussian simulation, sequential indicator simulation or multipoint simulation. These techniques are respectively described in the following documents:

Le Loc'h G. and Galli A., 1997: Truncated Plurigaussian Method: Theoretical and Practical Points of View. In: Geostatistics Wollongong '96, E. Y. Baafi and N. A Schofield eds, Kluwer, p. 211-222

P. Goovaerts, "Geostatistics for Natural Resources Evaluation", Oxford University Press, 1997.

S. Strebelle, "Conditional Simulation of Complex Geological Structures Using Multi-point Statistics", Mathematical Geology, 34(1), p. 1-21, 2002.

According to the invention, each one of the cells of the geological model contains information on at least the lithologic facies proportion values, for example: 15% sand, 30% sandstone, 5% clay, etc. The facies proportions can be identical in all the cells of a layer of the model (case of a stationary model) or they can vary from one cell to the next (case of a non-stationary model). These initial geological facies proportions can be determined from the well data and/or from seismic attributes or data. This stage is known and the following documents are referenced by way of example:

Doligez B., Fournier F., Jolivet G., Gancarski S., Beucher H., 2002: Seismic Facies Map Integration in Geostatistical Geological Model: a Field Case. EAGE, Conference & Technical Exhibition of European Association of Geoscientists & Engineers, 64th, Florence, 27-30 May 2002, Extended Abstracts, Vol. 2, P215-219, Barens L., Biver P., 2004: Reservoir Facies Prediction from Geostatistical Inverted Seismic Data, Abu Dhabi International Conference and Exhibition, 10-13 October, SPE 88690-MS, French patent application 06/10,792.

From the facies proportions and the well data, a geostatistical simulation technique, such as the thresholded Gaussian method, is used to generate one or more realizations of lithologic facies distributions on the geological grid. For each realization, the probability of simulation of a lithologic facies in a grid cell is conditioned by the facies proportion data. Advantageously, this geological model also contains information on the petrophysical properties (porosity, permeability, etc.) that are assigned to the lithologic facies.

The petroleum reservoir is equipped with wells having known production data from which the geological model is to be calibrated.

3. Calibration of the Geological Model by Dynamic Data (History Matching)

Usually, history matching loops can be summarized as follows. First of all, the geological model is transferred to a coarse scale referred to as "reservoir scale". These scale notions are known. A model referred to as "reservoir model" is then obtained, to which computer based numerical flow simulations are applied by a flow simulator which is a known type of software. The shift to the reservoir model scale allows reduction of the number of cells in relation to the fine geological model. In fact, the CPU time required for a flow simulation becomes acceptable in practice. Flow simulation provides simulated dynamic data that are then compared with the actually measured dynamic data. If the difference between the simulated dynamic data and the measured dynamic data is sufficiently small, the calibration process stops. In the opposite case, a return to the fine geological model is made that is modified to improve calibration of the production data. The iterative process is then repeated until calibration is considered to be satisfactory.

According to the invention, modification of the geological model is achieved through modification of the lithologic facies proportion values assigned to each cell of the geological model. There are therefore as many parameters to be modified as the model comprises cells. This number of parameters, which is much too large for practical use, leads to carrying out a suitable parameterization of the geological model. This parameterization allows reduction of the number of parameters to be modified upon each iteration while allowing adjustment of the lithologic facies proportions of the geological model to reproduce dynamic data measured in the field.

According to the invention, the calibration parameter, which is a parameter of the geological model to be modified in order to meet the dynamic data, is the average lithologic facies proportion in a zone. What is referred to as "average lithologic facies proportion" is the global estimation of the proportions on a discretization volume made up of a given set of cells (zone). What is referred to as "local lithologic facies proportions" are the proportion data in a volume reduced to a cell of the model.

The method then directly perturbs the average proportions in a zone of one or more facies in the directions determined by the optimizer in order to reduce the difference between the dynamic data and the associated simulated responses. A block indicator cokriging method allows estimation of the proportions of a facies while imposing the average proportion desired for the facies in a zone. The spatial continuity of the perturbations between a perturbed zone and a non-perturbed zone is guaranteed by the cokriging method.

Starting from an initial geological model, the method for modifying the geological model mainly comprises:

a). defining at least one geographical zone Z of the reservoir by selecting a set of cells of the geological model. The geographical zone can, for example, correspond to one or more wells, or to the geological model as a whole;

b). selecting k facies, whose average proportions are to be modified in zone Z $(p_Z^k)^f$, to improve calibration;

c). selecting as the parameters, that is adjustable values, the average proportions for each facies k in zone Z, denoted by $(p_Z^k)^f$. During the calibration process, the values of the parameters are modified to minimize the difference between the measured production data and the corresponding simulated responses. This modification is calculated automatically by the optimizer, for example according to the derivatives of the function measuring the difference between numerical data and responses in relation to the parameters of the problem. Thus, the average proportions $(p_Z^k)^f$ in zone Z are determined by an optimization process; and d). the proportions of the k lithologic facies are modified in each cell of the geographical zone while a block indicator cokriging method which respects the average proportion $(p_Z^k)^f$ imposed on the zone.

Conditioning through kriging is a known technique. The algorithm described below is detailed in:

P. Goovaerts, "Geostatistics for Natural Resources Evaluation", Oxford University Press, 1997.

Kriging is an interpolation technique based on a linear combination of the available static data. The weighting coefficients have the particular feature of depending on the correlations between the data and the point where the kriging estimation is to be determined. Kriging allows construction of an average and deterministic model representative of the reservoir. In the present case, by knowing the values of the proportions at some points, the proportions can be estimated at any point from a kriging technique. The cokriging technique is also a linear combination technique used to construct an average model. Its particular feature is that it integrates information relative to a second property in addition to the direct measurements of the property to be estimated. For example, knowing the values of the proportions at some points and the average value of the proportions in some zones, it is possible to estimate the proportions at any point from a cokriging technique. The average proportions in zones are considered to be the secondary variable, hence the term "block cokriging".

In order to directly perturb the facies proportions, cokriging is applied here to the indicator functions associated with each facies. An indicator function is a binary function that can only have the values 0 and 1. In the case of the method, an indicator function $I_k$ is defined for each facies k in each cell of the geological model. It has the value 1 if facies k is present in the cell being considered, and otherwise the value of 0. It is known that the estimator of function $I_k$ obtained by cokriging at one point is equal to the occurrence probability of facies k at this point by knowing the data used in the cokriging procedure (proportion of facies k at some points or average value in some zones). Block indicator cokriging thus directly provides an estimation of the facies proportions.

Kriging is based on a linear combination of the available static data, weighted by coefficients linked with the correlations between these data and the point subject to kriging. These correlations depend on the distance between the data and the point, and are expressed by a variogram. The variogram defines a zone of influence around each point, such that any other point beyond this zone is not correlated to the point being considered. The value of the correlation between two correlated points depends on the distance between these points. In the case of indicator kriging, the selection of the variogram associated with each indicator (and therefore with each facies) determines for a large part the spatial trends of the proportions, and thus plays an important part in the geological model.

According to the invention, for each facies, any proportion deduced from the block cokriging stage, less than 0, is brought to 0 (or to a value close to 0). Similarly, any proportion greater than 1 is brought back to 1 (or to a value close to 1).

Finally, all the facies proportions are normalized so that, in each cell, the sum of the facies proportions is equal to 1.

a. A new geological model constrained by the modified lithologic facies proportions is simulated.

4. Optimization of the Underground Medium Development from the Calibrated Model

From this calibrated geological model, that is respecting the static data and the dynamic data, it is possible to assess the operating mode of the underground zone being studied, to predict the reservoir production and thus to optimize its development by testing various production scenarios. A production scenario comprises, among other things, determination of the location of a production well or of an injection well, the constitution of the drilling mud, the completion characteristics, the selection of a hydrocarbon recovery method (such as waterflooding for example) and of the parameters required to implement this method (such as the injection pressure, the production flow rate, etc.).

The method is particularly interesting in the case of local perturbations because it provides continuity of the perturbations over the entire domain. The method can be applied either to directly perturb the vertical proportion curves or to perturb the facies proportion matrix deduced from the vertical proportion curves. In the first case, the perturbation can affect the entire geological model, zones localized around the wells or layers of the geological model. In the second case, the perturbation can affect the entire geological model or any sub-domain of the geological model. This flexibility relative to the definition of the zone is important notably for taking into account data providing a wide spatial cover such as seismic data.

Embodiment 1

According to an embodiment, the zones correspond to wells. In this case, the modification of the cells of the zone corresponds to a modification of the vertical proportion curves. The vertical proportion curve can be modified globally or locally. The method allows continuous perturbation of the proportions. In this context, a local deformation is obtained either by perturbing a single vertical proportion curve, in which case the deformation is localized around the wells associated with this curve, or by perturbing the vertical proportion curves for the various wells or groups of wells in a given interval, in which case the deformation can be very extensive laterally but restricted vertically.

Regarding the vertical proportion curves, no conditioning is imposed on the wells with only an average being imposed on a block.

Initially, a proportion curve $R^0(u)$ is available representative of the variations of the proportion of a facies along a well. The goal of the cokriging method is to modify curve $R^0(u)$ so as to obtain a curve $R(u)$ respecting the various imposed conditions. In the present case, an average value has to be imposed on a given zone.

It is assumed that $R(u)$ has a covariance function $C(h)$, h being the distance between two points. $\bar{R}(u_\beta)$ is defined as the average of $R(u)$ on a block $B_\beta$ centered on point $u_\beta$. It is assumed that $\bar{R}(u_\beta)$ is known on $n_\beta$ blocks $B_\beta$, $\beta \in [1, n_\beta]$. Average $\bar{R}(u_\beta)$ is considered to be a secondary kriging variable. The simple cokriging estimator can be written as follows:

$$R(u) = R^0(u) + \sum_{\beta=1}^{n_\beta} \mu_\beta(u) \bar{C}(B_\beta, u)$$

where values $\mu_\beta$, $\beta=1, \ldots, n_\beta$ are the weights of the simple cokriging and $\bar{C}(B_\beta, u)$ is the covariance between block $B_\beta$ and point u. These weights are determined by solving the linear system:

$$\begin{bmatrix} \bar{C}_{B_1 B_1} & \cdots & \bar{C}_{B_1 B_{n_\beta}} \\ \vdots & \ddots & \vdots \\ \bar{C}_{B_{n_\beta} B_1} & \cdots & \bar{C}_{B_{n_\beta} B_{n_\beta}} \end{bmatrix} \begin{bmatrix} \mu_1 \\ \vdots \\ \mu_{n_\beta} \end{bmatrix} = \begin{bmatrix} \bar{R}(u_1) - \bar{R}^0(u_1) \\ \vdots \\ \bar{R}(u_{n_\beta}) - \bar{R}^0(u_{n_\beta}) \end{bmatrix}$$

where $\bar{C}_{B_\alpha B_\beta}$ is the covariance between block $B_\alpha$ and block $B_\beta$.

This method is not limited to simple cokriging. Any other cokriging type can be considered.

Application Example

Figure 1:
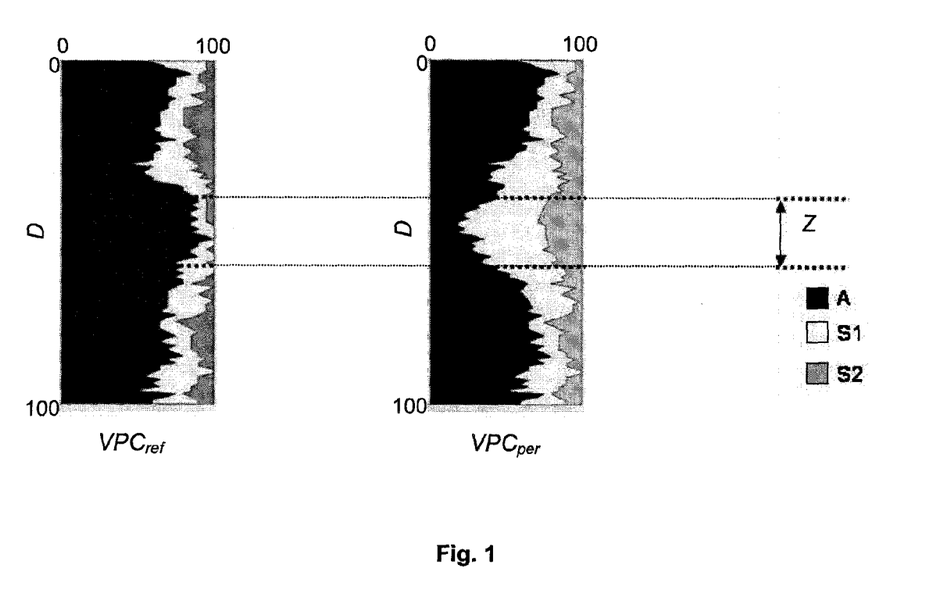
FIG. 1 illustrates reference facies proportion curves ($VPC_{ref}$) and facies proportion curves after perturbation according to the method of the invention ($VPC_{per}$)
Figure 2:
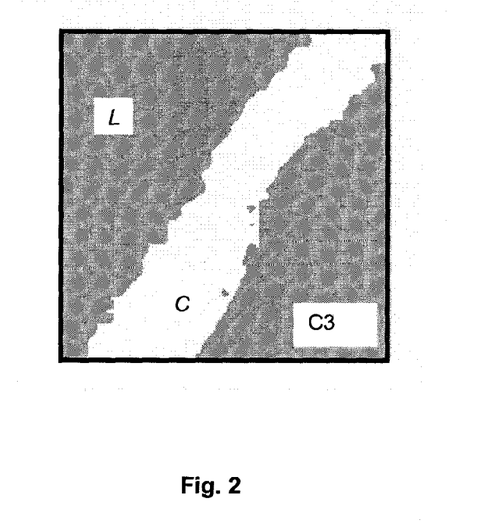
FIG. 2 illustrates a definition of two regions having channels and levees in a sedimentary layer C3.

The application example presented here is the perturbation of a vertical proportion curve. The model has three facies, a clay facies (A) and two sand facies (S1) and (S2). The reservoir is made up of 100 layers. In order to calibrate the geological model with the dynamic data, the proportion of sand in a central zone Z is to be increased by grouping together layers 40 to 60. FIG. 1 shows the initial vertical proportion curve ($VPC_{ref}$) and the curve obtained after perturbation. The second curve ($VPC_{per}$) is the result of the method according to the invention, by imposing on zone Z the following average proportions:

$$\begin{cases} p_Z(A) = 0.3 \\ p_Z(S_1) = 0.46 \\ p_Z(S_2) = 0.23. \end{cases}$$

Essential differences with the prior methods are observed. First of all, the method according to the invention provides continuity of the proportion curve, even after a local perturbation. Furthermore, the selection of the variogram associated with the proportions of a given facies is more natural: in fact, the variogram identified for the facies in question is taken up.

Embodiment 2

According to another embodiment, the zone corresponds to a sub-volume of the geological model. In this case, the modification of the cells of the zone corresponds to a modification of the proportion matrix deduced from the vertical proportion curves. Calibration of the 4D seismic data in addition to the production data may require a greater flexibility in the definition of the sub-domain to be modified than provided by the facies proportion curve modification method.

For example, if the seismic data indicate the presence of a channel, the channel can be defined as a zone and an attempt is made to try to increase the proportion of sand in this zone to improve data calibration.

The method is identical to the previous case, except that it is possible to use well conditioning data. Well conditioning is introduced in the cokriging algorithm as follows: if the conditioner on a cell m is facies k, $p^k(m)=1$ and $\forall l \neq k$, $P^l(m)=0$ is imposed.

The cokriging method used is a simple cokriging method.

$R(u)$ is assumed to be known at $n_\alpha$ points $u_\alpha$, $\alpha \in [1,n_\alpha]$ and characterized by a covariance function $C(h)$, and h is the distance between two points. $\overline{R}(u_\beta)$ and the average of $R(u)$ on a block $B_\beta$ centered on point $u_\beta$ is defined. $\overline{R}(u_\beta)$ is assumed to be known on $n_\beta$ blocks $B_\beta$, and $\beta \in [1,n_\beta]$. Average $B_\beta$, $\beta \in [1,n_\beta]$ is considered to be a secondary variable. The simple cokriging estimator can be written as follows:

$$R(u) = R^0(u) + \sum_{\alpha=1}^{n_\alpha(u)} \lambda_\alpha(u) C(u_\alpha - u) + \sum_{\beta=1}^{n_\beta} \mu_\beta(u) \overline{C}(B_\beta, u)$$

where $\lambda_\alpha$ and $\mu_\beta$ are the simple cokriging weights. These weights are determined by solving the linear system:

$$\begin{bmatrix} C_{11} & \cdots & C_{1n_\alpha} & \overline{C}_{1B_1} & \cdots & \overline{C}_{1B_{n_\beta}} \\ \vdots & \ddots & \vdots & \vdots & \ddots & \vdots \\ C_{n_\alpha 1} & \cdots & C_{n_\alpha n_\alpha} & \overline{C}_{n_\alpha B_1} & \cdots & \overline{C}_{n_\alpha B_{n_\beta}} \\ \overline{C}_{B_1 1} & \cdots & \overline{C}_{B_1 n_\alpha} & \overline{\overline{C}}_{B_1 B_1} & \cdots & \overline{\overline{C}}_{B_1 B_{n_\beta}} \\ \vdots & \ddots & \vdots & \vdots & \ddots & \vdots \\ \overline{C}_{B_{n_\beta} 1} & \cdots & \overline{C}_{B_{n_\beta} n_\alpha} & \overline{\overline{C}}_{B_{n_\beta} B_1} & \cdots & \overline{\overline{C}}_{B_{n_\beta} B_{n_\beta}} \end{bmatrix} \begin{bmatrix} \lambda_1 \\ \vdots \\ \lambda_{n_\alpha} \\ \mu_1 \\ \vdots \\ \mu_{n_\beta} \end{bmatrix} = \begin{bmatrix} R(u_1) - R^0(u_1) \\ \vdots \\ R(u_\alpha) - R^0(u_\alpha) \\ \overline{R}(u_1) - \overline{R}^0(u_1) \\ \vdots \\ \overline{R}(u_{n_\beta}) - \overline{R}^0(u_{n_\beta}) \end{bmatrix}$$

where $\overline{C}_{B_\beta \alpha}$ is the covariance between block $B_\beta$ and point $u_\alpha$.

In order to accelerate the solution, an influence ellipsoid is determined for each point by the variogram. The three axes of the ellipsoid are defined by the correlation lengths and the anisotropy axes of the variogram. The covariance between a given point and another point exterior to its influence ellipsoid is zero. Consequently, the various covariance calculations are carried out only within this ellipsoid.

This method is not limited to simple cokriging. Any other type of cokriging can be considered.

Application Example

The application example presented is a synthetic case representing a well test simulation in a channel. An initial model is constructed with a geostatistical simulation using the thresholded Gaussian method (Le Loc'h and Galli, 1997). The initial facies proportions give the main trends of the spatial distribution of the facies. The reservoir model is assumed to be described by four facies, which are, in increasing order of reservoir quality, "clays" (F1), "laminated clays" (F2), "laminated sands" (F3) and "sands" (F4).

Le Loc'h G. and Galli, A., 1997: Truncated Plurigaussian Method: Theoretical and Practical Points of View. Geostatistics Wollongong'96, E. Y. Baafi and N. A. Schofields eds, Kluwe, p. 211-222.

A well test (draw-down) is simulated with reference facies proportions over a period of 100 h with a constant flow rate of 650 m³/day. The well test synthetic data are the pressure difference and the derivative thereof.

The method according to the invention (with indicator cokriging) is applied in order to improve the well test data calibration. The calibration parameters defined are the average proportion of "clay" facies in the "levee" (L) region, the average proportion of the "laminated clays" facies in the "levee" region, the average proportion of the "sand" facies in the "channel" region and the average proportion of the "laminated sands" facies in the "channel" (C) region. Optimization is performed from proportion values obtained in each cell by applying the cokriging method to the reference proportions with the initial parameters given in Table 1.

TABLE 1

| | | Definition of the parameters | | |
| --- | --- | --- | --- | --- |
| Region | Facies | Reference value | Initial value | Optimum value |
| Levee (L) | F1 | 0.492 | 0.726 | 0.478 |
| Levee (L) | F2 | 0.418 | 0.183 | 0.428 |
| Channels (C) | F3 | 0.443 | 0.72 | 0.471 |
| Channels (C) | F4 | 0.459 | 0.18 | 0.436 |

Figure 3:
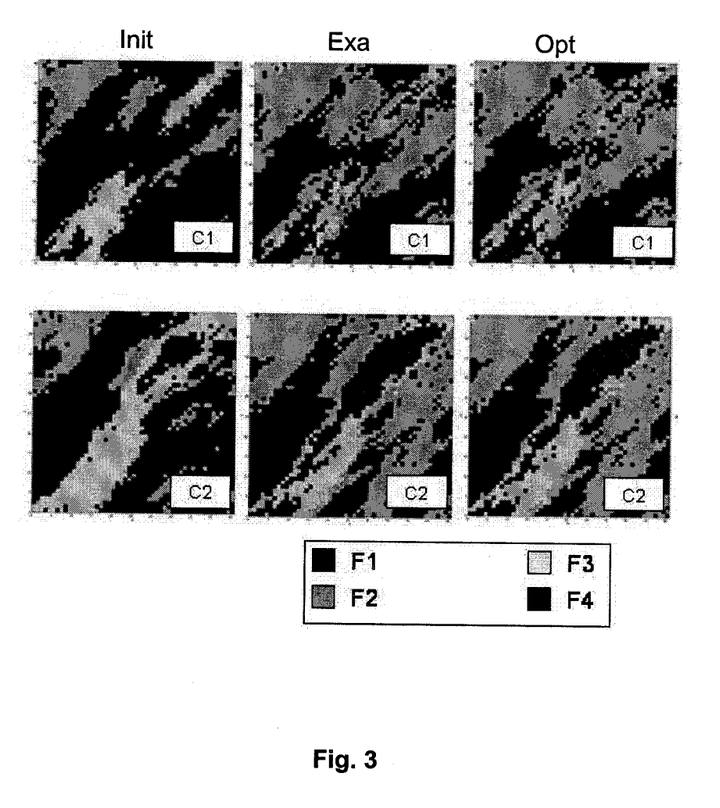
FIG. 3 shows the spatial distribution of the facies in the reservoir model before (Init) and after (Opt) calibration of the facies proportions for sedimentary layers C1 and C2, as well as the exact spatial distribution (Exa) of the facies.
Figure 4:
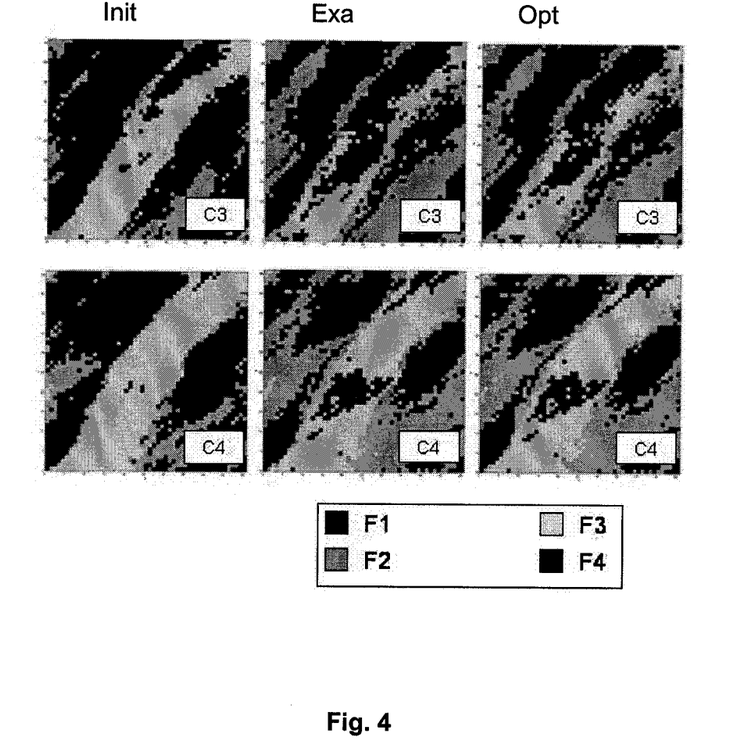
FIG. 4 shows the spatial distribution of the facies in the reservoir model before (Init) and after (Opt) calibration of the facies proportions for sedimentary layers C3 and C4, as well as the exact spatial distribution (Exa) of the facies.

The algorithm converges in 28 iterations. The objective function decreases from 26.475 to 0.015. The optimum values obtained for the various parameters are close to the reference values and they allow nearly-perfect restoration of the reference results obtained for the well test. FIG. 3 and FIG. 4 show the impact of the calibration on the facies realization: FIG. 3 shows the spatial distribution of the facies in the reservoir model before (Init) and after (Opt) calibration of the facies proportions for sedimentary layers C1 and C2, as well as the exact spatial distribution (Exa) of the facies; FIG. 4 shows the spatial distribution of the facies in the reservoir model before (Init) and after (Opt) calibration of the facies proportions for sedimentary layers C3 and C4, as well as the exact spatial distribution (Exa) of the facies.

The invention claimed is:

1. A computer based method of optimizing development of an underground medium, from a geological model including a set of grid cells discretizing the medium with a facies value assigned to each cell wherein a difference is measured between measured dynamic data values and simulated dynamic data values by using a computer based flow simulator applied to the geological model and the geological model is modified to reduce the difference, comprising:

a) defining at least one geographical zone within the underground medium by selecting a set of cells of the geological model;

b) determining, for the facies, with an optimization process, an average proportion in the at least one geological zone allowing the difference to be reduced;

c) modifying proportions of the facies in each cell of the at least one geographical zone, with a block indicator cokriging method constrained by the average proportions, wherein an indicator function is defined for each facies in each cell as a binary function by cokriging as an occurrence probability of the facies of this cell and by assigning value 0 to any modified proportion which is less than 0 and assigning value 1 to any modified proportion greater than 1 and normalizing proportions of the facies which are modified so that in each cell a sum of the proportions of the facies is equal to 1; and d) simulating with a computer a new geological model constrained by the proportions of the facies which are modified and optimizing development of the underground medium by using the simulated model.

2. The method as claimed in claim 1, wherein the at least one geographical zone is a sub-domain of the geological model, a group of sub-domains of the geological model or an entire geological model.

* * * * *